United States Patent [19]

Kim

[11] Patent Number: 5,592,771
[45] Date of Patent: Jan. 14, 1997

[54] TUBULAR FISHING ROD AND ITS METHOD OF MANUFACTURE

[75] Inventor: Young-Mook Kim, Pusan, Rep. of Korea

[73] Assignee: Wonder Co., Ltd., Pusan, Rep. of Korea

[21] Appl. No.: 365,943

[22] Filed: Dec. 29, 1994

[30] Foreign Application Priority Data

Jan. 12, 1994 [KR] Rep. of Korea ............... 1994-539

[51] Int. Cl.⁶ ............................................. A01K 87/00
[52] U.S. Cl. .................................. 43/18.1; 43/18.5
[58] Field of Search ........................... 43/18.1, 18.5

[56] References Cited

U.S. PATENT DOCUMENTS 4,653,216  3/1987  Inoue ........................... 43/18.5
5,239,768  8/1993  Michishita ..................... 43/18.1
5,328,742  7/1994  Tukihara ....................... 43/18.1

FOREIGN PATENT DOCUMENTS 131413    6/1947   Australia ........................ 43/18.1
62-280026 12/1987  Japan ............................ 43/18.1
63-49426  3/1988   Japan ............................ 43/18.1

Primary Examiner—Joseph J. Hail, III
Assistant Examiner—I.-H. Lin
Attorney, Agent, or Firm—Birch, Stewart, Kolasch & Birch, LLP

[57] ABSTRACT

A tubular fishing rod includes a plurality of multiple helical windings intertwined with a plurality of multiple reverse helical windings and its method of manufacture, whereby the resulting tubular fishing rod has high elasticity, excellent softness and super power control properties.

4 Claims, 1 Drawing Sheet

TUBULAR FISHING ROD AND ITS METHOD OF MANUFACTURE

BACKGROUND OF THE INVENTION

1. Field of the Invention

The present invention relates to a tubular fishing rod and its method of manufacture and more particularly, to an improved tubular fishing rod including a plurality of multiple helical windings intertwined with a plurality of multiple reverse helical windings of a tow or yarn for providing high elasticity, excellent softness and super power control properties and its method of manufacture.

2. Description of Related Art

Various types of fishing rods are well known in the art. Such conventional fishing rods are made by the following process. After a properly sized sheet of carbon prepreg such as a pre-impregnated material containing glass fibers is wound onto a steel fishing rod as a mold, a polyethylene or polypropylene tape is then wound on the rod mold. Thereafter, the above rod mold is molded and processed and the steel rod mold is then separated therefrom and the tape is removed from the sheet to form the conventional fishing rod.

However, these conventional fishing rods suffer from a number of problems such as, for example, they tend to crack when the fishing rod is exposed to shock. Also, conventional fishing rods do not posses high elasticity, excellent softness and super power control, and also they are expensive to manufacture due to the complicated manufacturing steps which are required.

SUMMARY OF THE INVENTION

Accordingly, it is an object of the present invention to provide a tubular fishing rod, which eliminates the above problems encountered with conventional fishing rods.

Another object of the present invention is to provide an improved tubular fishing rod including a plurality of multiple helical windings intertwined with a plurality of multiple reverse helical windings of a tow or yarn, whereby the tubular fishing rod possesses high elasticity, excellent softness and super power control properties.

A further object of the present invention is to provide a method of manufacturing a tubular fishing rod which comprises the steps of helically winding a tow or yarn on a steel fishing rod mold, helically winding the tow or yarn on the steel fishing rod in the reverse direction for intertwining with the first windings, and repeating the helically winding in both the forward and reverse directions until the windings are positioned close together, and finally separating the steel fishing rod mold from the tubular windings.

Still another object of the present invention is to provide a tubular fishing rod which is simple in structure, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a tubular fishing rod including a plurality of multiple helical windings intertwined with a plurality of multiple reverse helical windings and to its method of manufacture whereby the tubular fishing rod has high elasticity, excellent softness and super power control properties.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Referring now in detail to the drawings for the purpose of illustrating preferred embodiments of the present invention, the tubular fishing rod and its method of manufacture as shown in FIGS. 1, 2(A), 2(B) and 2(C) comprises a tow or yarn 2 which is helically wound as windings 3, 3a, 3b, and 3c and intertwined with a plurality of multiple reverse helical windings 4, 4a, 4b, and 4c, and the process is repeated until the manufacture of the tubular fishing rod is complete.

The tow or yarn 2 is made of carbon or glass fibers containing a natural or synthetic resinous material. Also, the tow or yarn 2 can be in the form of a string, a braid or a bundle. Advantageously, the resin is an epoxy resin.

The method of manufacturing the tubular fishing rod (FIG. 1) according to the present invention can be described as follows. First of all, as shown in FIG. 2(A), the tow or yarn 2 winds helically on a steel fishing rod mold 1 from one end (A) of the steel fishing rod mold 1 to the other end (B) thereof for defining the plurality of multiple helical windings 3, 3a, 3b, and 3c.

Figure 2A:
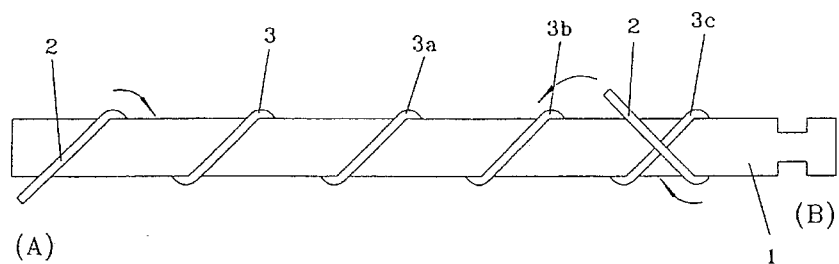
FIG. 2(A) is a front elevational view showing the tubular fishing rod which is manufactured, according to the present invention, by helically winding a tow or yarn on a fishing rod mold in a first direction.
Figure 2B:
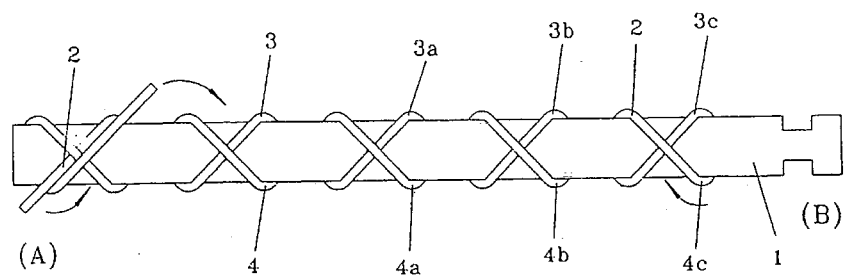
FIG. 2(B) is a front elevational view showing the manufacture of the tubular fishing rod of the present invention by helically winding the tow or yarn on the fishing rod mold in a reverse direction.

Secondly, as shown in FIG. 2(B), the tow or yarn 2 is helically wound in the reverse direction on the steel fishing rod mold 1 from end (B) of the steel fishing rod mold 1 to the other end (A) thereof. At this time the reverse helical windings 4, 4a, 4b, and 4c are intertwined with the plurality of multiple helical windings 3, 3a, 3b, and 3c, respectively, to define a crosswise winding arrangement of the yarn.

Figure 2C:
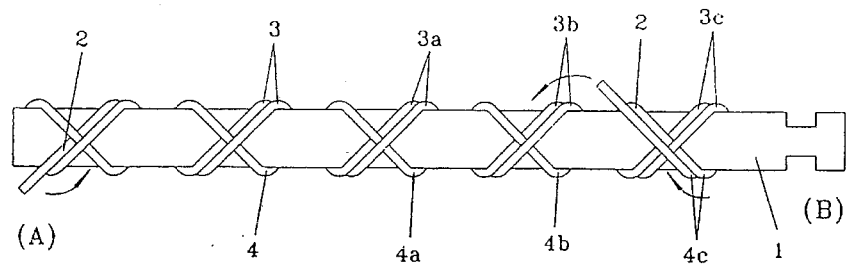
FIG. 2(C) is a front elevational view of the tubular fishing rod manufactured by the present invention showing a second helical winding of the tow or yarn on the fishing rod mold.

Thirdly, as shown in FIG. 2(C), the tow or yarn 2 is wound helically on the fishing rod mold 1 from end (A) to the other end (B) of the steel fishing rod mold 1. At this time, the helical windings 3, 3a, 3b, and 3c are intertwined with the plurality of multiple reverse helical windings 4, 4a, 4b, and 4c, respectively, for achieving a crosswise winding arrangement.

Thereafter, the tow or yarn 2 is helically wound in forward and reverse directions until the cross winding tow or yarn 2 are disposed in a close side-by-side relationship for forming the tubular fishing rod in accordance with the present invention. Advantageously, the composite is heated whereby the resin facilitates the bonding together of the helical windings.

Figure 1:
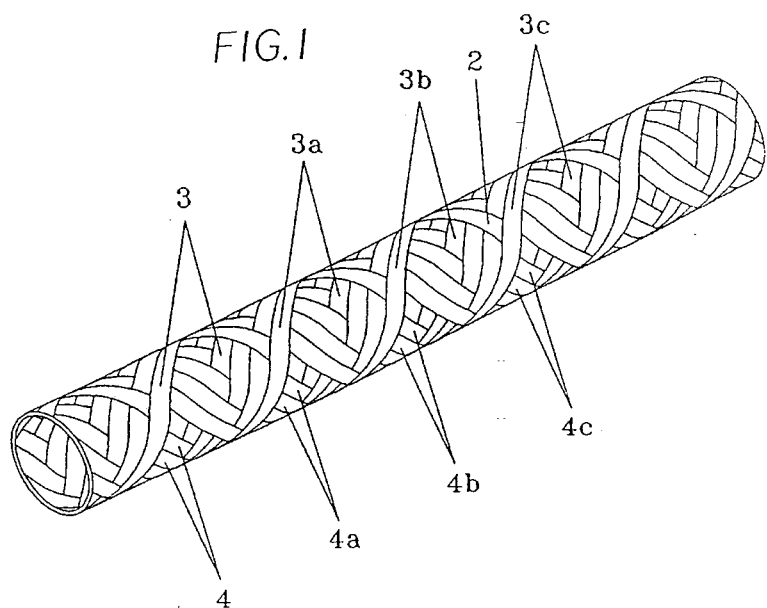
FIG. 1 is a perspective view of a tubular fishing rod according to the present invention.

Finally, the steel fishing rod mold 1 is separated from the tubular fishing rod to produce the tubular fishing rod according to the present invention as shown in FIG. 1.

Accordingly, the tubular fishing rod of the present invention as shown in FIG. 1 has high elasticity, excellent softness, and super power control so that the tubular fishing rod does not break, has a long lifetime and can be mass-produced. In order to produce a thick rod with increased hardness, the winding process is continuously repeated.

In addition, the tubular fishing rod according to the present invention is simple in structure, inexpensive to manufacture, durable in use and refined in appearance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tubular fishing rod comprising:

a first plurality of multiple helical windings of a tow or yarn, in one direction and at a right-hand pitch;

a second plurality of multiple helical windings of a tow or yarn wound in the reverse direction and at a left-hand pitch, said second plurality of multiple helical windings being intertwined with said first plurality of multiple helical windings thereby defining a crosswise tubular weave construction which is both strong and flexible, all of the weaving being one of the right-hand and left-hand pitches and the right-hand and left-hand pitches being a generally uniform, constant pitch except for at ends of the fishing rod, the first and second multiple helical windings being free of internal structures such that the fishing rod is hollow and is made only from the plurality of windings.

2. The tubular fishing rod of claim 1, wherein said plurality of helical windings of opposite directions are alternately disposed to form said tubular construction.

3. The tubular fishing rod of claim 1, wherein said tow or yarn is a string, a braid, or a bundle of fibers.

4. The tubular fishing rod of claim 2, wherein said tow or yarn is made of carbon containing epoxy resin or glass fiber containing resin.

* * * * *